United States Patent [19]

Ohtsubo

[11] Patent Number: 5,427,141
[45] Date of Patent: Jun. 27, 1995

[54] PRESSURE FLUID CONTROL VALVE DEVICE

[75] Inventor: Kizuku Ohtsubo, Kawasaki, Japan

[73] Assignee: Fuji Oozx Inc., Japan

[21] Appl. No.: 308,443

[22] Filed: Sep. 19, 1994

[51] Int. Cl.6 .............................. F16K 11/052
[52] U.S. Cl. ......................... 137/595; 137/862
[58] Field of Search ............ 137/601, 607, 595, 862

[56] References Cited

U.S. PATENT DOCUMENTS

| | | | |
|---|---|---|---|
| 3,897,524 | 7/1975 | Freismuth et al. | 137/601 X |
| 4,512,372 | 4/1985 | Lew et al. | 137/862 |
| 5,084,031 | 1/1992 | Todd et al. | 137/595 X |
| 5,269,347 | 12/1993 | Beasley | 137/607 X |

Primary Examiner—Stephen M. Hepperle
Attorney, Agent, or Firm—Hoffman, Wasson & Gitler

[57] ABSTRACT

In a pressure fluid control valve device, the fluid exhausted from an internal combustion engine flows through a pair of paths selectively or simultaneously. Each of the paths is opened and closed by a butterfly valve fixed to a valve shaft. A coupling for connecting the valve shafts across the paths comprises a slitting recess and a projection provided at the opposing ends of the valve shafts respectively. The direction of the surface of the recess and the projection is set to within 30 degrees with respect to the direction of the surface of the valve disc fixed to the valve shaft having the recess. Thus, the corner of the recess is not engaged with the bearing surface which is loaded, thereby making axial length for connecting the valve shafts to zero to manufacture the light and compact device.

2 Claims, 3 Drawing Sheets

PRESSURE FLUID CONTROL VALVE DEVICE

BACKGROUND OF THE INVENTION

The present invention relates to a pressure fluid control valve device in which pressure fluid such as exhaust gas exhausted from an internal combustion engine is flowed into two paths selectively or simultaneously.

Such device is disclosed in U.S. patent application Ser. No. 08/258499 entitled "Valve Device for Controlling a High Temperature Fluid", in which there is provided a valve device for controlling a high temperature fluid, comprising a main passage for the fluid; a secondary passage for the fluid disposed in parallel with the main passage; a first valve disc provided in the main passage and perpendicular to the main passage; a second valve disc provided in the secondary passage and perpendicular to the secondary passage; a first valve shaft for rotating the first valve disc; a second valve shaft for rotating the second valve disc disposed in the same axis as that of the first valve shaft; and a shaft coupling for connecting the end of one of the first and second valve shafts with the end of the other valve shaft with a gap for allowing thermal expansion of the valve shafts. There is advantage that the first valve shaft for opening and closing the valve disc for the first passage and the second valve shaft for opening and closing the valve disc for the second passage are provided respectively, and by connecting the first and second valve shafts by the shaft coupling with the gap, axial thermal expansion of the first and second valve shafts is allowable. Even if one of the valve shafts is thermally expanded, the other will not be affected by the expansion, thereby preventing unsmooth operation of opening and closing.

As example of such coupling, a jack shaft coupling comprises a recess at the end of one of valve shafts adjacent to each other; and a projection at the end of the other of the valve shafts, whereby the valve shafts are axially movable, but is not rotatable to each other. In the foregoing valve device, the coupling has diameter larger than that of the valve shaft, or the outer circumferential surface of the jack shaft coupling has a notch, the corner of which rubs the bearing surface to increase wear of the bearing surface. Thus, it is not preferable to bear the coupling portion directly, but the coupling portion is provided far from a bearing portion of each valve shaft. As a result, in a partition wall between the paths, there are provided two bearings for two valve shafts adjacent to each other with a length required to receive the coupling, thereby increasing the width of the partition wall and the length of the valve shafts to make the device itself larger, which is disadvantageous.

SUMMARY OF THE INVENTION

In view of the disadvantages in the prior art, an object of the invention is to provide a pressure fluid controlling valve device in which axial length for connecting the valve shafts to each other is made to be substantially zero as close as possible, thereby reducing its size and weight.

According to the present invention, there is provided a pressure fluid control valve device which comprises a body; a pair of parallel paths for the pressure fluid; a pair of butterfly valve discs for opening and closing the paths; a pair of valve shafts to which the valve discs are fixed, the valve shafts being rotatably provided in the same axis perpendicular to the paths; and a coupling which comprises a slitting recess at an end of one of the valve shafts, and a projection at an end of the other of valve shafts the projection being engaged in said recess with a slight play to connect the valve shafts to be slightly movable in axial direction to each other, but not to be rotatable to each other, the direction of the surface of the recess and the projection of the coupling being set to within 30 degrees with respect to the direction of the surface of the valve disc fixed to the valve shaft having the recess, the valve shafts being borne to the body at the coupling.

To give maximum load onto the bearing surface of the valve shaft is when the valve disc is closed, and the load is given perpendicular to the surface which receives pressure at the valve disc. Thus, the direction of the surface of the recess and the projection of the coupling is set to within 30 degrees with respect to the direction of the surface of the valve disc fixed to the valve shaft having the recess of the coupling. Therefore, even if the valve shaft is borne by the coupling area, the corner of the recess is not engaged with loaded portion of the bearing surface when the valve disc fixed to the valve shaft having the recess is opened, and the valve shaft is borne in the coupling area, thereby making axial length for connecting the shafts to zero to shorten the length of the valve shaft and the width of the partition wall, so that a compact device can be manufactured.

BRIEF DESCRIPTION OF THE DRAWINGS

The features and advantages will be described in detail on the basis of the following embodiment with respect to drawings wherein.

DETAILED DESCRIPTION OF PREFERRED EMBODIMENTS

Figure 1:
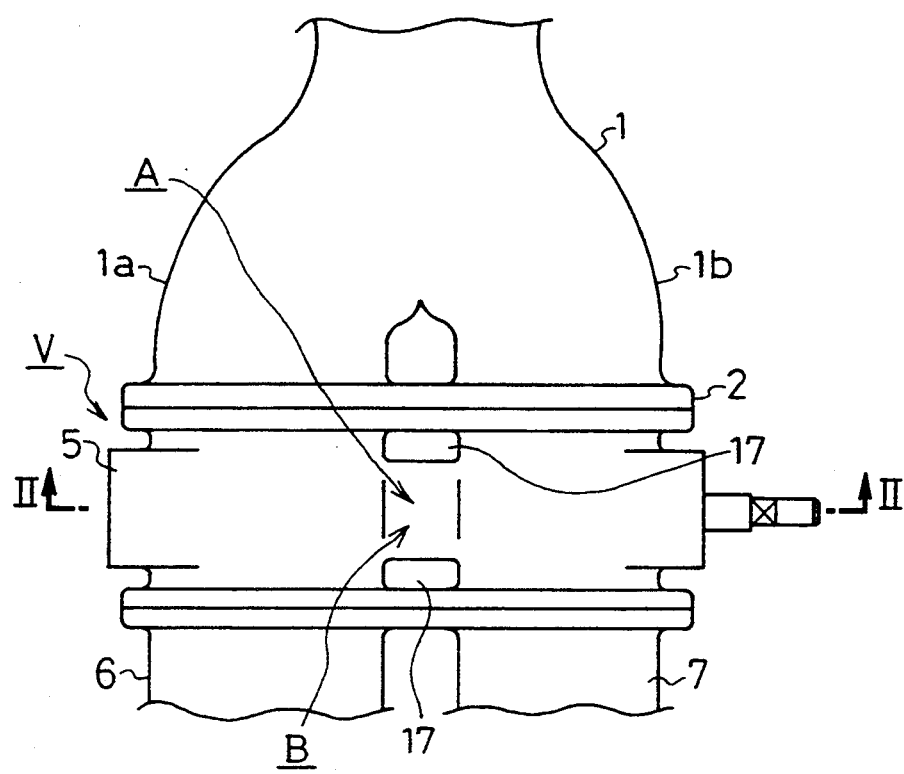
FIG. 1 is a plan view which shows one embodiment in which a device of the present invention is applied to an exhaust gas switch device in an automobile.
Figure 2:
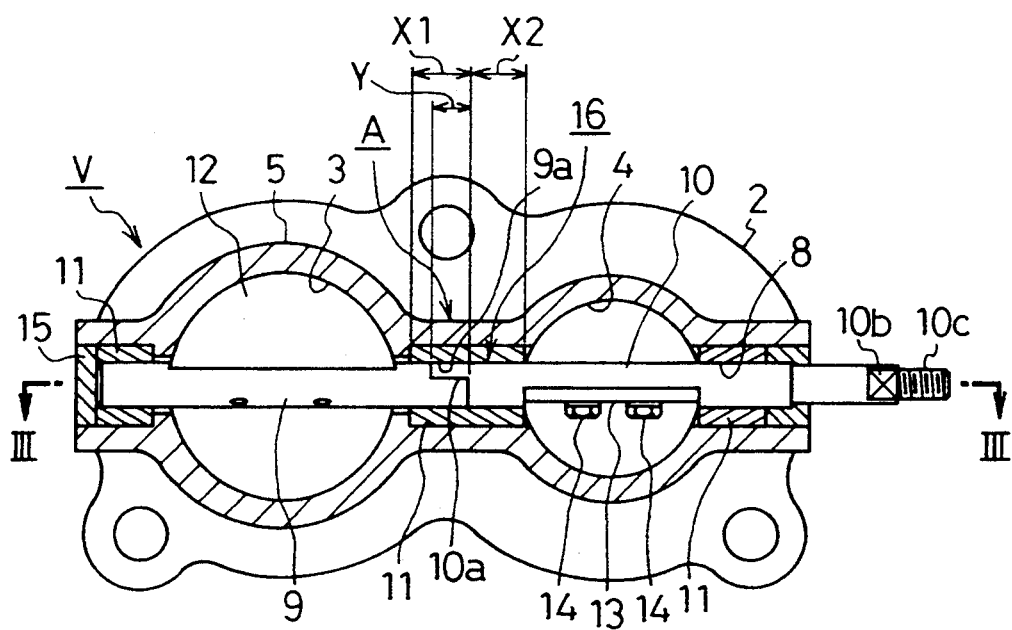
FIG. 2 is an enlarged sectional view taken along the line II—II in FIG. 1.
Figure 3:
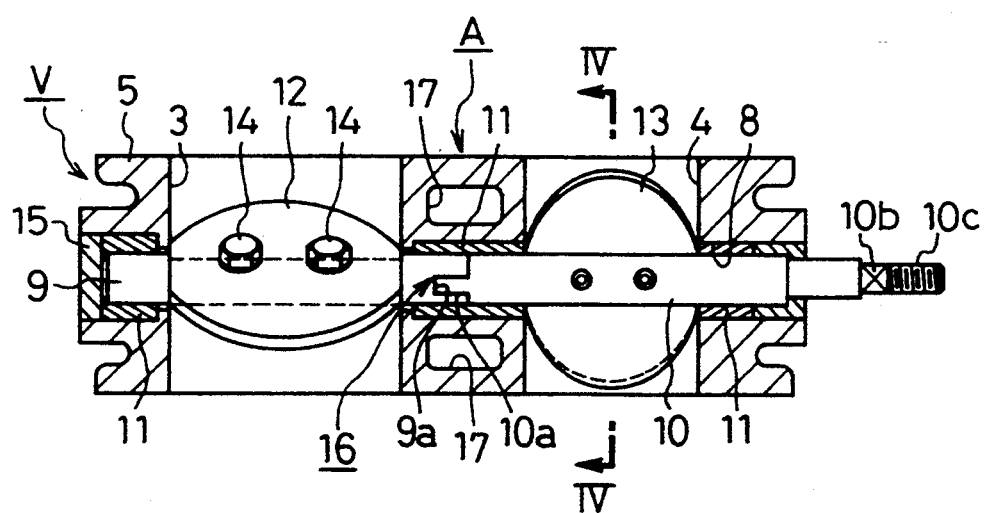
FIG. 3 is a sectional view taken along the line III—III in FIG. 2.

In FIGS. 1 to 5, the numeral 1 denotes a forked tube the upstream end of which is connected or integrally formed with an exhaust manifold (not shown) of an automobile and the downstream end of which is divided into two branched tubes 1a and 1b the ends of which are connected with the upstream end of a valve device "V" of this invention via a flange coupling 2. The valve device "V" comprises a body 5 in which two parallel paths 3 and 4 for pressure fluid are formed to communicate with the branched tubes 1a and 1b. In this embodiment, the path 3 is formed as a larger diameter main path, while the path 4 is formed as a smaller diameter subsidiary path.

A main exhaust tube 6 is connected to the downstream end of the path 3 of the body 5, and the downstream end of the path 4 is connected to a by-pass tube 7 joined to the main exhaust tube 6 via means such as a catalytic exhaust gas purification device or exhaust gas utilizing device (not shown). In the middle of the body 5, a straight axial bore 8 is provided perpendicular to the paths 3 and 4, and two valve shafts in series are rotatably supported by a bearing 11 in the axial bore 11. Butterfly valve discs 12 and 13 for opening and closing the paths 3 and 4 respectively are fixed to the middles of B the valve shafts 9 and 10 by bolts 14. The left end of the axial bore 8 is closed by a closing member 15. The valve shafts 9 and 10 are connected to be axially movable but not to be rotatable to each other, by a coupling 16 which comprises a recess 9a at the end of one of the valve shafts 9 and 10, and a projection 10a at the end of the other of the valve shafts 9 and 10, the projection 10a being engaged in the recess 9a with a small play.

Figure 5:
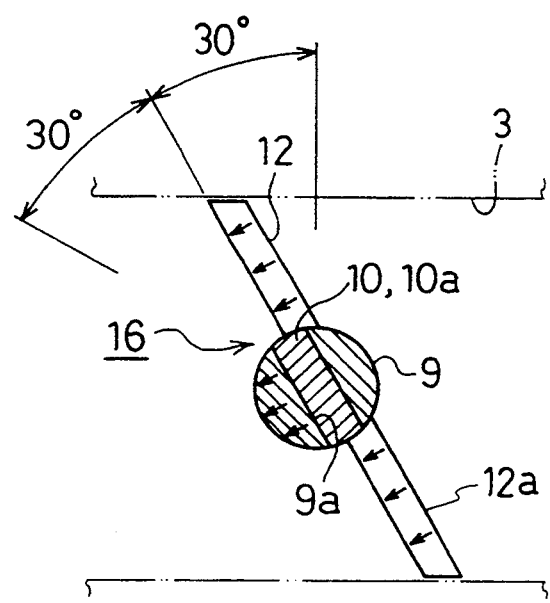
FIG. 5 is a vertical sectional view which shows a coupling and a valve disc.

As shown in FIG. 5, the direction of the surface of the recess 9a and the projection 10a is substantially the same as the direction of the surface 12a of the valve body 12 fixed to the valve shaft 9 in the recess 9a. At the coupling 16, the valve shaft 9 is supported in the body 5 via the middle bearing 11, so that a bearing area "X1" contains a coupling area "Y" at the side of the valve shaft 9 in the middle bearing 11, and the bearing area "X1" is substantially equal to a bearing area "X2". The width of a partition wall "A" is made to be smaller than that in a conventional device. Not to engage a corner of the projection 10a with the inner surface of the bearing 11, the length of the projection 10a perpendicular to the center of the valve shaft 10 may be slightly smaller than the length of the recess 9a.

At the right end of the valve shaft 10 which projects from the axial bore 8 rightwards, there are provided a rectangular axial portion 10b and a male screw 10c for connecting it to an actuator(not shown). The numeral 17 denotes an air hole provided through the partition wall "A" of the body 5.

Figure 4:
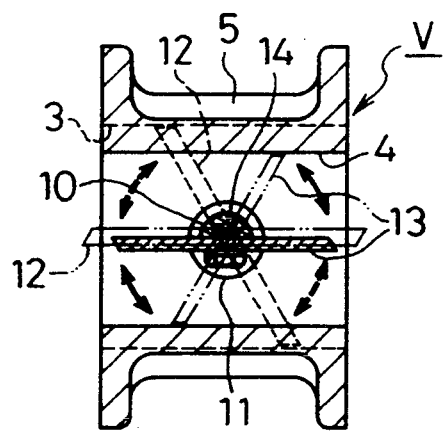
FIG. 4 is a sectional view taken along the line IV—IV in FIG. 3.

As shown in FIG. 4, the valve discs 12 and 23 are fixed to the valve shafts 9 and 10 respectively such that, when one 12 of the valve discs completely closes the path 3, the other 13 of the valve discs completely opens the path 4 (as shown by solid and dotted line in FIG. 4), and when one 12 of the valve discs completely opens the path 3, the other 13 of the valve discs completely closes the path (as shown by two dotted line in FIG. 4). The valve shaft 10 is rotated in one or other direction by the actuator, the valve shaft 9 and the valve discs 12 and 13 are rotated with the valve shaft 10, so that the paths 3 and 4 are closed oppositely to the above.

In this embodiment, as mentioned above, the direction of the surface of the recess 9a and projection 10a of the coupling 16 is substantially the same as that of the surface 12a of the valve disc 12 fixed to the valve shaft 9 having the recess 9a, and the valve shaft 9 is rotatably supported in the body 5 via the bearing 11. So, even if the valve shaft 9 is supported in the coupling 16, it is not capable of engaging a corner of the recess 9a with a loaded portion of the bearing surface of the bearing 11 so as to contact an arcuate outer circumferential surface which is loaded by the bearing surface of the bearing 11 smoothly, thereby avoiding rubbing of the corner of the recess 9a against a portion which is loaded by the bearing surface of the bearing 11 and preventing increase in wear of the bearing surface.

The valve shaft 9 is borne by the portion of the coupling, so that axial length for connecting the valve shafts 9 and 10 to each other is made to zero so as to shorten the length of the valve shafts 9 and 10 and decrease the width of the partition wall "A". Without changing the size of the paths 3 and 4 and valve discs 12 and 13, the device itself can be made to be compact and light.

Even if the valve shaft 10 is subject to a large load when the valve body is opened, there is little likelihood that the corner of the projection 10a rubs the inner surface of the bearing 11. As mentioned above, the length of the projection 10a perpendicular to the axis of the valve shaft 10 is slightly smaller than the length of the recess 9a, thereby preventing rubbing of the corner of the projection 10a against the inner surface of the bearing when the valve disc 12 opens.

Most preferably, the direction of the surface of the recess 9a is substantially the same as that of the surface of the valve disc 12. If the direction of the recess 9a is disposed within 30 degrees with respect to the direction of the surface of the valve disc 12, similar results could be achieved. If it exceeds 30 degrees, wear will drastically increase in the inner surface of the bearing 11. Thus, it may be preferably set to within 30 degrees with respect to the direction of the surface of the valve disc 12.

The foregoing description merely relates to embodiments of the invention, but various modifications and changes may be made by persons skilled in the art without departing from the scope of claims wherein:

What is claimed is:

1. A pressure fluid control valve device which comprises:
   a body;
   a pair of parallel paths for the pressure fluid;
   a pair of butterfly valve discs for opening and closing the paths;
   a pair of valve shafts to which the valve discs are fixed, the valve shafts being rotatably provided in the same axis perpendicular to the paths; and
   a coupling which comprises a slitting recess at an end of one of the valve shafts, and a projection at an end of the other of valve shafts the projection being engaged in said recess with a slight play to connect the valve shafts to be slightly movable in axial direction to each other, but not to be rotatable to each other, the direction of the surface of the recess and the projection of the coupling being set to within 30 degrees with respect to the direction of the surface of the valve disc fixed to the valve shaft having the recess, the valve shafts being borne to the body at the coupling.

2. A valve device as defined in claim 1 wherein the direction of the surface of the recess and the projection of the coupling is substantially the same as the direction of the surface of the valve disc fixed to the valve shaft having the recess.

* * * * *